(12) United States Patent
Paul

(10) Patent No.: US 8,163,122 B1
(45) Date of Patent: Apr. 24, 2012

(54) MULTIDIRECTIONAL FILAMENT REINFORCED TAPE AND METHOD OF MANUFACTURE

(75) Inventor: Kermit D. Paul, Bethlehem, PA (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 11/506,497

(22) Filed: Aug. 18, 2006

(51) Int. Cl.
  *B29C 65/00* (2006.01)
  *B32B 37/00* (2006.01)
  *D04H 3/08* (2006.01)

(52) U.S. Cl. ...... 156/265; 156/180; 428/102; 428/298.7

(58) Field of Classification Search ............ 442/59, 442/32, 38–41, 58, 43, 366–369, 206–207; 428/292.1–301.4, 105–115, 137, 285, 901; 156/234, 235, 238, 247, 248, 256, 264, 265, 156/267, 301, 353, 517, 523, 574, 765, 166, 156/169, 170, 171, 174, 175, 184, 188, 190, 156/177, 179, 192, 193, 182
See application file for complete search history.

(56) References Cited

U.S. PATENT DOCUMENTS

| | | | | |
|---|---|---|---|---|
| 3,183,142 A | * | 5/1965 | Tierney | 428/109 |
| 4,089,190 A | | 5/1978 | Worgan et al. | |
| 4,532,169 A | * | 7/1985 | Carley | 428/109 |
| 4,559,262 A | * | 12/1985 | Cogswell et al. | 428/298.7 |
| 4,690,972 A | * | 9/1987 | Johnson et al. | 524/609 |
| 4,883,552 A | * | 11/1989 | O'Connor et al. | 156/180 |
| 5,268,050 A | * | 12/1993 | Azari | 156/180 |
| 5,641,366 A | | 6/1997 | Hohman | |
| 5,662,761 A | * | 9/1997 | Middelman et al. | 156/324 |
| 6,265,333 B1 | | 7/2001 | Dzenis et al. | |
| 2003/0124287 A1 | * | 7/2003 | Grosskrueger et al. | 428/36.91 |

* cited by examiner

*Primary Examiner* — Jennifer Chriss
*Assistant Examiner* — Altrev Sykes
(74) *Attorney, Agent, or Firm* — Donald DeJoseph; Aaron M. Pile; Jeffrey A. Sharp

(57) ABSTRACT

The apparatus is a laminar shear resistant pre-impregnated resin tape for use in die forming pultrusion processes, with the tape formed by integrating three distinguishable layers, each with integrated parallel reinforcing filaments. The layers are arranged within the tape so that the filaments of adjacent layers are oriented at angles to each other. The tape of the preferred embodiment of the invention is constructed with the filaments of the center layer at 90 degrees to the length of the tape and the filaments of the two outer layers aligned with the length of the tape. The center layer can be more heavily loaded with filaments than conventional tapes, and the outer two layers have less than the amount of filament load of the center layer.

1 Claim, 2 Drawing Sheets

MULTIDIRECTIONAL FILAMENT REINFORCED TAPE AND METHOD OF MANUFACTURE

BACKGROUND OF THE INVENTION

This invention deals generally with filament reinforced thermoplastic pre-impregnated tape, and more specifically with a multiple directional and multiple layer filament reinforced thermoplastic tape for use in pultrusion processes.

Mixtures of various filaments and plastic resins are used to produce composites that have unique properties compared to the traditional engineering materials like metals and non-reinforced plastics. The filaments in the resin matrix increase the strength of the composites so much that they far exceed even the strongest metals, although composites are much lighter than their metal counterparts.

Thermoplastic resins are often used to make these composites. Thermoplastic resins are solid at room temperature, and they soften and ultimately melt at elevated temperatures turning into a very viscous liquid. Reinforced thermoplastic composites are typically produced by intermingling finely ground resin particles with bundles of filaments and elevating the temperature above the resin's melting point, but below the filament melting point. This causes the resin to wet the filaments and to encapsulate them in the resin. Conventionally, the filament bundles must be opened up before wetting can occur, but the filaments remain aligned in the direction of the tape.

This form of filament reinforced pre-impregnated resin composite is called a prepreg. It is usually made into a simple sheet like form that is the basic component subsequently used to make more complex finished parts. The prepreg is very strong in the filament direction, but is relatively weak in the transverse direction.

One of the products produced from this process is called prepreg tape which has a width dimension significantly smaller than its length. Reinforced thermoplastic prepreg tape can be used in a pultrusion process in which several layers of tape first pass through a heater to remelt the resin. The soft viscous column of resin and filaments then passes through a die, which forms the final desired shape, fusing the resin from all the layers together, after which the composite hardens into its final shape. Various shapes such as solid, hollow, round, square, flat, or irregular can be produced. In most cases the finished part requires its highest strength in the length direction of the part, which is the direction the filaments would be naturally oriented.

However, there are some specialized applications where the highest strength is required at 90 degrees from the length direction of the part. In these cases a special layup of prepreg is required to get a substantial amount of the filaments oriented 90 degree from the length direction of the pultrusion. For example, a long rectangular cross section part such as a 0.5" thick×4" wide×36" long slab which is loaded so the stress lines run laterally requires that a substantial amount of filaments be oriented in the width direction, perpendicular to the thickness and length directions.

Presently, making a suitable tape for such a structure with the reinforcing filaments running across the width requires first slitting conventional unidirectional reinforced prepreg tape into strips of the desired 4 inch width of the tape to make a base strip that is spooled. Subsequently cross pieces of unidirectional prepreg tape are cut to a length matching the 4 inch width of the base strip and placed on top of the base strip with the reinforcing filaments of the cross pieces oriented at 90 degrees to the reinforcing filaments of the base strip. The short cross pieces are then attached to the base strip, typically by spot welding the short pieces to the base strip, to form a two layer tape.

Multiples of these two layer tapes are stacked and then used as the feed material for the pultruding process. In a typical example, there could be nearly 25 two layer tapes used to make the finished part. The 25 two layer layers would be pulled like a stack of pages in a book through the die.

This process is labor intensive and less than ideal. Frequently the spot welds do not hold when the two layer coils are being prepared. The pieces then must be manually reattached. In other cases the pieces may fall off, after previously being attached, and they have to be manually retrieved and reattached before entering the pultruder preheater. If a piece is absent in the composite, the finished product is defective.

In such tapes the quantity of filaments placed in the transverse direction is limited to be no greater than that placed in the longitudinal direction. Therefore, the final product is only as strong in the transverse direction as it is in the longitudinal direction. The resulting composite is inefficient because the 50% of the filament oriented in the lengthwise direction is not used to carry the bending load across the width direction. Ideally, for bending loads nearly all the filaments should be in the transverse direction, not just half of them.

Another problem is that the alternating layers of 0 and 90 degree filaments must be arranged to achieve a balanced design. However, using the two layer tapes, an operator error is easily possible. If two adjacent tapes are oriented so either their 90 degree or 0 degree filament layers face each other then the finished product will have two 90 degree layers and two 0 degree layers next to each other rather than the desired alternating 0 and 90 degree layers. This results in a product flaw.

Furthermore, in order for the stack of tapes to slide properly on the preheater or pultruder die surfaces, an extra layer of 0 degree prepreg must be on the top or bottom surface of the stack of tapes to cover the 90 degree layer that should not be an outside layer. This extra 0 degree layer protects the otherwise exposed 90 degree layer from rolling up in the pultruding process and jamming the pultruder. However, because both outside layers must be 0 degree layers, the first load bearing cross filament 90 degree layer is at least one full layer thickness away from the outer surface where it would be most effective in carrying the bending load.

Components made using a 0 and 90 degree prepreg orientation can also exhibit shear failures when subjected to bending. This failure mode is most prevalent in products made from prepreg that has high filament loading and low resin content. High filament loading is typically used in products requiring high strength. These failures typically occur at the interface between the 0 and 90 degree layers at the center of the bending plane; but usually never within a composite layer itself. This shear failure condition can limit the ultimate strength of the part.

It would be very beneficial to have a prepreg tape that overcomes this problem of shear failure due to delamination of the layers.

SUMMARY OF THE INVENTION

The present invention is a prepreg tape that consists of three layers of filaments and resin. The layers are fully bonded by fusing them together by using the resin already present in each layer, so that the finished three layer prepreg tape has the physical appearance of being a single layer tape. The center layer has its filaments oriented at 90 degrees or some other transverse angle to the length direction of the tape, and it is sandwiched between two thin layers with 0 degree filaments, filaments that run in the length direction of the tape.

In the preferred embodiment of the invention the filament load of the 90 degree center layer is substantially the same as presently used in the spot welding process previously described. However, each of the 0 degree layers has less weight of the filaments than are used in the transverse filament layer. In the preferred embodiment of the invention, both of the 0 degree layers are identical. However, there are other applications where the filament loading of the outer layers can vary.

The tape of the present invention can be substituted for the prior art two layer tape and eliminate the previously described shortcomings of the prior art products. The prepreg tape of the present invention eliminates the spot welding attachment process and the problems and limitations inherent in that type of construction. Moreover, the ratio of transverse to axial filament placements can easily be increased from the prior art 1:1 to almost any greater proportion. Such a higher ratio greatly increases the efficiency of filament usage in the composite and makes the final part stronger. Of course, the angle between the transverse filaments and the length dimension of the tape can also be varied.

The prepreg tape of the invention also has a balanced design so that any layer in the feed to the pultruder can be turned over without altering the filament stack up configuration of the finished part. Using the prepreg tape of this invention eliminates the possibility of the operator error in the pultrusion process in which two 0 degree and two transverse filament layers are adjacent in the finished product.

The prepreg tape of the invention has a 0 degree filament layer on both its surfaces, and therefore no extra layer of 0 degree prepreg is required as a cover for an otherwise exposed outer layer of 90 degree filaments before feeding the pultruder. The tape of this invention also allows the first transverse load bearing layer of filaments to be much closer to the outer surface, thereby increasing the strength of the final product.

Using tape of this invention also permits the filament loading of the transverse filament layer to be increased to a very high level with low resin content. Low resin content has normally promoted shear failure in prior art prepreg, however, since the amount of filament used in the 0 degree layers can be kept low, the outer 0 degree layers can be richly loaded with resin. These 0 degree layers then bond well to the resin lean transverse filament layer, and they also bond well to each other when processed in the pultruder. Therefore, the end products are not prone to the same degree of laminar shear failure as prior art products even though most of the filament is in a resin lean environment.

Several alternate embodiments of the invention are also available. The two outer layers can be produced so they are not identical. The prepreg tape from this embodiment can include solid lubricants mixed with the resin used in one or both of the 0 degree outer layers. Solid lubricants typically have a deleterious affect on the mechanical properties of a composite as the concentrations are increased. If used throughout the entire composite, the amount must be kept quite low to prevent serious degradation of strength. However, with this embodiment one thin outer layer can be heavily loaded with a solid lubricant while keeping the two other layers in the tape at a low, safe, level of lubricant, or even without any lubricant. This prepreg tape can then be used as the outer layer of the pultruded part, with the lubricated surface facing outward. The finished pultruded part is mechanically sound while still being highly self lubricated on the outer surface. A variation of this embodiment uses only the two unidirectional plies, one heavily loaded with solid lubricant and the other at a very low level or lubricant free.

Another embodiment of the invention has the center layer of filament orientated at an angle other than 90 degrees from the length direction of the prepreg tape. An angle of 45 degrees is a better for some applications where, for example, the part must withstand torsion.

Another embodiment of the invention eliminates the central layer with transverse filaments and uses two unidirectional layers in the prepreg tape, each with substantially different properties to overcome a common composite part manufacturing problem. Resin fouling of pultruder preheaters and die contact surfaces is a problem when a prepreg tape's resin content exceeds a certain loading. In the prior art, this problem is addressed by using single layers of low resin loaded and high filament loaded prepreg tape as the outermost layers of the tape stack entering the pultruder. However, when the resin level is reduced low enough to totally solve the fouling problem, the lean resin skin doesn't adhere well to the core of the pultruded part, and if the outer protective layer delaminates from the core the final product is defective. In this situation, a two layer prepreg tape with substantially different filament content and resin loading is appropriate. One layer, which is placed to become the outer surface of the tape stack, is heavily loaded with filament and lightly loaded with resin, and the second transitional layer which will be the innermost layer carries a light load of filament and is heavily loaded with resin. The innermost highly resin loaded transitional layer easily fuses with the resin in the other tapes in the core and produces a strong bond. The outer layer, which is heavy on filament and lightly loaded with resin, contacts the preheater and die surfaces and scours those surfaces. If the entire thickness of the prepreg tape were made with this low resin loading it would not bond to the core.

The present invention thereby provides prepreg tapes that solve many of the problems that plague the use of such tapes in pultruders.

DETAILED DESCRIPTION OF THE INVENTION

Figure 1:
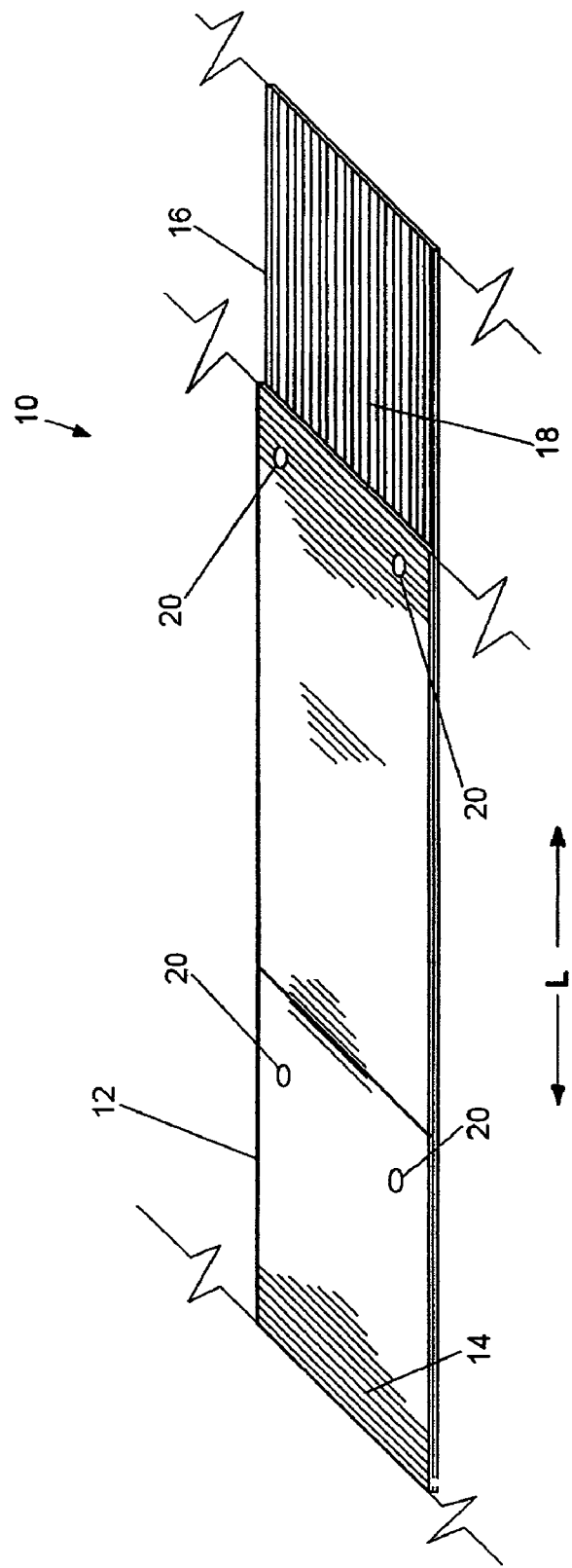
FIG. 1 is a perspective view of a short length of a typical two layer filament reinforced prepreg tape of the prior art.

FIG. 1 is a perspective view of a short length of typical two layer filament reinforced prepreg tape 10 of the prior art showing first layer 12 with its filaments 14 aligned transverse to the length dimension L of the finished tape. First layer 12 is shown cut back to better show second layer 16, although such tapes have both layers of the same length. Second layer 16 is shown with its reinforcing filaments 18 running parallel to length dimension L of tape 10. The short cross pieces used to form layer 12 are spot welded to layer 16 at locations 20 as indicated in FIG. 1.

A typical prior art prepreg manufacturing method for thermoplastic resins using a wet slurry wetout process begins with spools of filaments positioned on a creel rack, which allows them to unwind as the filaments are pulled from the spools. Usually a tensioning device controls the tension of each bundle of filaments, which is called a "tow", as it is being pulled off each spool.

The tows are guided into a wetout bath where the filaments in each tow are opened up to allow resin particles suspended in a slurry of water and powdered resin to intermingle with the filaments. The wet web consisting of filaments, resin particles, and water emerges from the wetout system with the filaments oriented in the direction in which the web is pulled through the process.

The wet web is then pulled through a drying oven where the water is evaporated from the web leaving only resin powder intermingled with the filaments. The dried web then passes through a melting oven where the web temperature is increased so it is above the resin's melting point leaving the resin in a fluid state and the filaments still in a solid state.

While the resin is still molten, it passes through a consolidator that firmly squeezes the resin and filaments into a thin sheet while expelling trapped air and solidifying the resin. The end result of this process is a single prepreg layer reinforced with unidirectional filaments oriented in the direction of the length of the layer. Such unidirectional thermoplastic prepreg single layers are not a consumer usable product in and of themselves. They are typically laminated using many layers, heated again to a temperature exceeding the resin's melting point, and compressed into a multilayer tape product.

Such multilayer tape products often require high strength in more than one direction. In those cases the tapes must have layers with transverse oriented filaments in order to meet the requirements for the final end products and take full advantage of the high strength properties of the reinforcing filaments.

As previously described, the prior art method of making a dual layer tape with a layer having the reinforcing filaments running across the width of the tape requires cutting cross pieces of unidirectional prepreg tape to a length matching the width of a base strip such as layer 16 of FIG. 1. First layer 12 is then formed by placing the cut cross pieces on top of layer 16 with their reinforcing filaments 14 oriented at 90 degrees to reinforcing filaments 18 of layer 16. The short cross pieces are then attached to base layer 16, typically by spot welding the short pieces to layer 16 at locations 20, to form a two layer tape.

Figure 2:
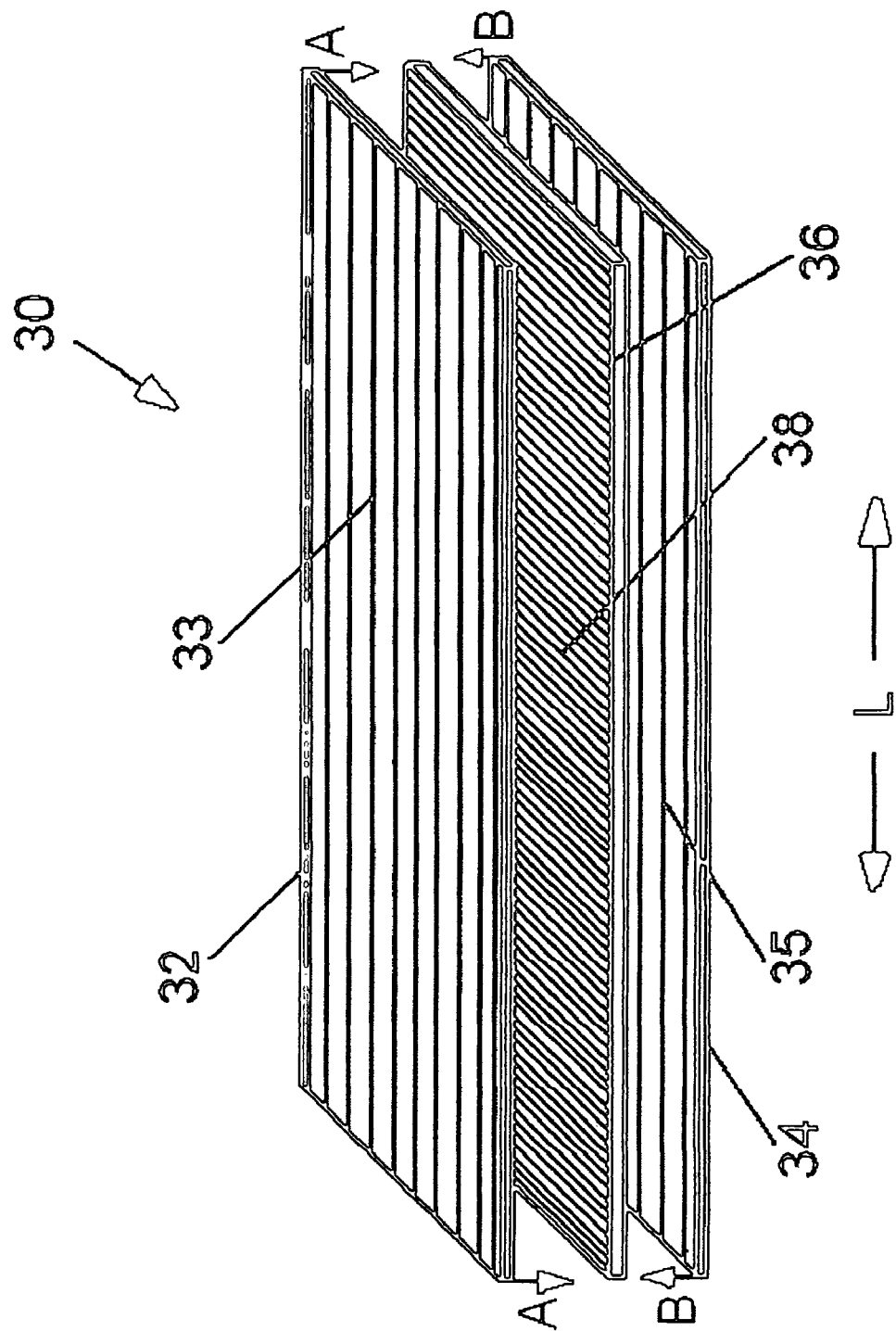
FIG. 2 is a perspective view of a short length of the three layer multidirectional filament reinforced prepreg tape of the preferred embodiment of the invention with the layers shown separated for ease of viewing.

FIG. 2 is a perspective view of a short length of three layer multidirectional filament reinforced prepreg tape 30 of the preferred embodiment of the invention with the layers shown separated for ease of viewing. In reality the layers would never be seen this way. Outer layer 32 and outer layer 34 would be in contact with and integrated with center layer 36 as indicated by arrows A and B. Layers 32, 34 and 36 all have filaments and resin, and the layers are fully bonded by fusing them together using the resin present in each layer, so that three layer tape 30 has the physical appearance of being a single tape. Center layer 36 has its filaments 38 oriented at 90 degrees to the length direction L of tape 30, and it is sandwiched between two thin outer layers 32 and 34 with 0 degree filaments 33 and 35, respectively. The 0 degree filaments run parallel to length direction L of tape 30.

In the preferred embodiment of the invention center layer 36 is 0.010 inch thick, has a filament weight of 134 grams/square meter, and uses polyphenylene sulfide resin in a concentration of 64 percent by weight. Outer layers 32 and 34 are 0.003 inch thick, have filament weights of 40 grams/square meter, and also use polyphenylene sulfide resin in a concentration of 64 percent by weight.

The filament weight of transverse filaments center layer 36 can be in the range of from 30 to 200 grams/square meter, and its thickness can be in the range of between 0.006 and 0.020 inch. However, in the present invention, outer layer 32 with filaments 33, and outer layer 34 with filaments 35, both with 0 degree filament orientation, have lower filament weights than is used in center layer 36, and also are thinner.

If the filament weight and resin concentration are both low, the thickness of the layer outer layers can be less than 0.002 inches. Usually it is very difficult to make unidirectional filament prepreg that is free of splits when the thickness is lower than approximately 0.006 inch, but an advantage of the present invention is that it can use 0 direction outer layers that are much thinner than 0.006 inch because the transverse filament layer maintains the integrity of the 0 layers during the drying and fusing process steps.

With high filament weights and resin concentrations the thickness of any layer can reach 0.020 inches. Normally, in the present invention this combination of high filament weights and resin concentrations would only be used for layers with filaments that are transverse to the length of the tape because the overall thickness and stiffness of the entire prepreg tape must also be considered. The combined thickness of all three layers can be as high as 0.030 inches, but 0.015 to 0.017 is a more practical limit so the prepreg tape can be coiled on spools for subsequent transportation and process handling. Thus, three layer tape 30 of the present invention is actually no thicker than the two layer tapes of the prior art and can be used in subsequent processing in the same manner as previous tapes.

In the preferred embodiment of the invention, layers 32 and 34 are identical. However, there are other applications where the filament loading can be different in the two outer layers. The resin for all the layers in the present invention can be either polyphenylene sulfide, polyetheretherketone, or any other thermoplastic resin that develops a good bond with the fiber.

The method of making multidirectional prepreg tape 30 is a multiple step process.

First, the material which is used for center layer 36 of tape 30 is manufactured by the conventional means used to produce unidirectional filament reinforced prepreg layers. The single layer from this step is typically 12 inches or wider and is spooled into a coil 500 to 1000 ft long.

The coiled single layer is then cut into lengths equal to the intended width of three layer prepreg tape 30. These pieces are stacked in a sheet feeder so they can be fed into the following process with their reinforcing filaments not aligned with the 0 degree filaments of the outer layers. In this example the filaments would be at 90 degrees to the outer layer filaments. The 90 degree sheets are fed into the prepreging process in such a way that there are no gaps or overlaps where adjacent sheets meet. After the three layer prepreg is finished it is difficult to see the 90 degree sheets meet each other.

During the next step the process is not conventional since two webs of unidirectional prepreg are used simultaneously in the process and the 90 degree sheets are also fed into the region between them. The two wet webs converge at the entrance of a vertically oriented drier and fusing oven. The 90 degree transverse filament sheets in this example are fed into the merge point of the two wet unidirectional webs. Surface tensions of the two wet webs hold the transverse filament sheets in place as they move upward through the drier. Both wet webs are dried in the drying oven. The layer with transverse filaments does not require drying.

The three layers are then passed through the fusing oven in which all three are heated so the resins in all three layers become molten. The three layers then pass through the consolidator where they are pressed into a single layer that has filaments oriented in two directions.

Tape 30 from this process is superior for the production of finished products that require filament orientation in more than one direction.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, layer thicknesses and filament weights of all the layers can be varied, various angles other than 45 or 90 degrees can be used for the orientation of the transverse filaments in center layer 36, and other thermoplastic resin materials such as polyetheretherketone can be used for the resin in the layers of the tape.

What is claimed as new and for which Letters patent of the United States are desired to be secured is:

1. A method of making three layer multidirectional filament reinforced prepreg tape for use in a multilayer article constructed of layers of said tape laminated together comprising:

manufacturing unidirectional filament reinforced material for a center layer of the tape by a pultrusion process;

cutting the filament reinforced material for the center layer into pieces with lengths equal to the intended width of the final three layer tape;

stacking the cut pieces into a sheet feeder for feeding into a subsequent step of the process with the filament reinforcing of the cut pieces aligned in a selected direction;

feeding the stacked cut pieces into a separation space between two previously manufactured moving wet webs of prepreg which have reinforcing filaments running in the direction of the length of the moving wet webs, with the stacked pieces moving into the separation space and being sandwiched between the wet webs as the wet webs are converging at the entrance of a drying oven, and with the stacked pieces oriented so that the reinforcing filaments of the sandwiched pieces run transverse to the reinforcing filaments of the moving wet webs;

passing the assembly of the wet webs and the sandwiched pieces through the drying oven and drying the wet webs;

passing the assembly of the webs and the sandwiched pieces through a fusing oven in which the webs and sandwiched pieces are heated so the resins in the webs and the sandwiched pieces become molten; and passing the assembly of the webs and the sandwiched pieces through a consolidator to press the assembly into a single prepreg tape that has filaments oriented in two directions.

* * * * *